United States Patent [19]
Savicki

[11] Patent Number: 5,345,327
[45] Date of Patent: Sep. 6, 1994

[54] DIGITAL INFRARED COMMUNICATIONS SYSTEM WITH EDGE DETECTION

[75] Inventor: Joseph P. Savicki, Clinton, N.J.

[73] Assignee: AT&T Bell Laboratories, Murray Hill, N.J.

[21] Appl. No.: 37,861

[22] Filed: Mar. 29, 1993

[51] Int. Cl.$^5$ .............................. H04B 10/00
[52] U.S. Cl. .................... 359/172; 359/142; 359/153; 375/113
[58] Field of Search ............ 359/142, 153–154, 359/159, 161, 172, 194, 853; 375/113, 121

[56] References Cited

U.S. PATENT DOCUMENTS

| 4,787,082 | 11/1988 | Delaney et al. | 370/85 |
| 4,935,927 | 6/1990 | Kaewell, Jr. et al. | 375/113 |

FOREIGN PATENT DOCUMENTS

| 0448152 | 9/1991 | European Pat. Off. | 359/142 |
| 4034154 | 5/1991 | Fed. Rep. of Germany | 359/143 |

OTHER PUBLICATIONS

F. R. Gfeller, et al. "Wireless In–House Data Communication via Diffuse Infrared Radiation", Proceedings of the IEEE, vol. 67, No. 11, Nov. 1979 pp. 1474–1486.

G. Smestad, et al. "The Thermodynamic Limits of Light Concentrators", *Solar Energy Materials*, 21 (1990) 99–111, North Holland.

*Primary Examiner*—Richard E. Chilcot, Jr.
*Assistant Examiner*—Kinfe-Michael Negash
*Attorney, Agent, or Firm*—Gordon E. Nelson

[57] ABSTRACT

A low-cost, low-power infrared digital communications system. The system overcomes the problem of infrared noise from interior lighting without using either a high-power infrared source or upmodulation of the source. The system includes an infrared collector which uses a non-directional concentrator to concentrate the infrared radiation and a circuit which detects the digital infrared signal in the noise by detecting the edges of the digital infrared signal. Devices in the system need not be aimed at each other, but need only be in line of sight of each other. The preferred embodiment employs the digital infrared signals to communicate between a set of digital devices and a breaker box connected to the telephone network.

31 Claims, 3 Drawing Sheets

DIGITAL INFRARED COMMUNICATIONS SYSTEM WITH EDGE DETECTION

CROSS-REFERENCE TO RELATED APPLICATIONS

This application is being filed on the same day as another application entitled *Infrared Collector* which has the same inventor and assignee as the present application and shares part of its disclosure with the present application.

BACKGROUND OF THE INVENTION

1. Field of the Invention

The invention relates to digital communication generally and to digital communication using infrared radiation in particular.

2. Description of the Prior Art

Infrared radiation has long been used for portable communications sytems designed for interior use. A simple example is the portable control device used to control consumer electronic devices such as televisions or VCRs. Most such control devices use infrared light to carry control signals from the device to the television or VCR.

Use of infrared radiation for digital communications in the interiors of buildings is also attractive. The infrared radiation has no noxious side effects and systems in different rooms will not interfere with each other. A problem with the use of infrared radiation for digital communications is, however, the fact that the typical interior environment produces a great deal of infrared noise. All types of AC lighting produce infrared noise and fluorescent lighting fixtures are particularly noisy. Two techniques have been used in the past to overcome the noise:

in one approach, the power of the infrared transmitter has simply been increased as required to overcome the noise and in the other, the signal employed by the communicating devices has been modulated up so that its frequency is different from that of the noise.

Both of these approaches have disadvantages. The first approach requires high levels of power; the second approach requires extra circuitry to do the modulation and demodulation of the infrared signals and infrared light emitting diodes capable of operating at the rate required for the transmission frequency. These disadvantages are particularly important in the area of portable digital communications equipment. The need for high power in portable equipment means that the equipment must be expensive, heavy, or both; the need for extra circuitry and fast light-emitting diodes adds to the expense. What is provided by the present invention is a simple, low-cost, low-power technique for distinguishing an infrared signal from infrared noise.

SUMMARY OF THE INVENTION

The invention takes advantage of a fundamental distinction between the digital signal used for communications and the noise: namely, that the digital signal changes abruptly between values representing a logical "0" and a logical "1" and consequently has rising and falling edges with slopes which are steeper than the slopes of the signals emitted by the interior lighting. In infrared receivers employing the invention, the receiver receives an input signal which includes the digital signal and the noise. In the receiver, there is circuitry which detects the rising and falling edges and outputs a signal indicating the existence of an edge and its direction. This information is then used to recover the transmitted digital signal from the input signal. While particularly useful in the contest of infrared communications, the invention may be used in any context where the noise has a slow rate of change relative to the rise time of the digital signal.

The foregoing and other objects and advantages of the invention will be apparent to one of ordinary skill in the art who peruses the following Drawing and Detailed Description, wherein:

Figure 1:
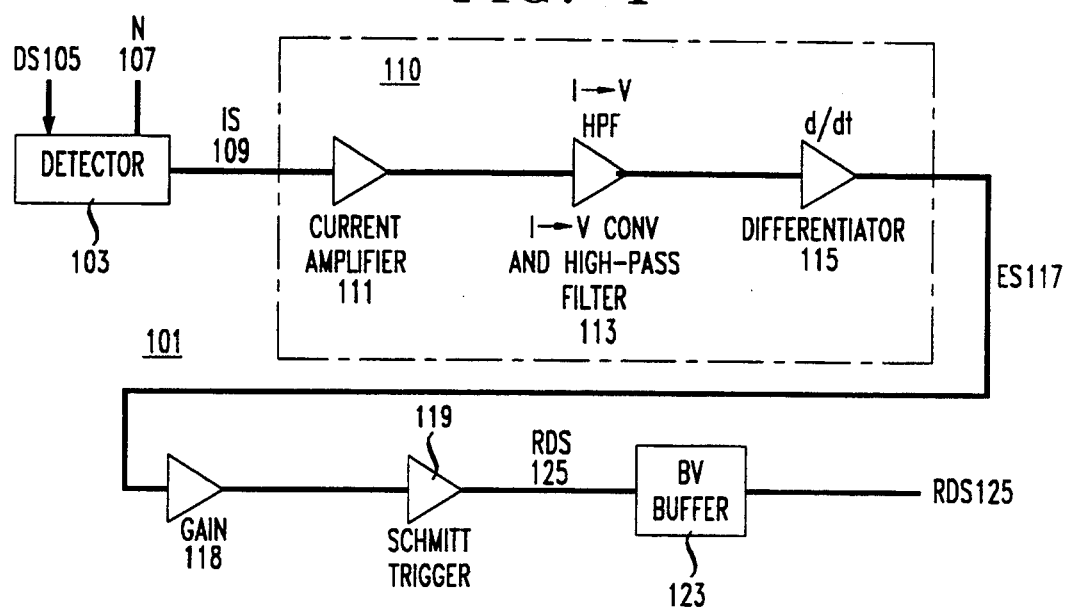
FIG. 1 is a block diagram of an edge detection circuit.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The environment in which an infrared communications system operates typically includes interior lighting from either incandescent or fluorescent (gas discharge) lighting. Such lighting is powered by alternating current and produces large amounts of infrared radiation at the frequency of the alternating current and the harmonics of that frequency. The infrared detector for an infrared communications system of course detects this infrared radiation along with the digital infrared communication signal. As a consequence, the output of the infrared detector is a signal which combines the infrared communication signal with the signal from the lighting. The portion of the output signal which is due to the radiation from the lighting is noise. If the digital infrared communications signal is a low powered signal, as is advantageous in portable infrared communications systems, the noise portion of the output signal has a much larger magnitude than the infrared communication signal portion and the noise signal must be removed from the output signal before the infrared communications signal can be interpreted. In the prior art, this problem has been solved by using the digital signal to modulate a high-frequency carrier. Difficulties with this approach in infrared communications include the fact that extra apparatus is required for modulation and demodulation and the fact that that the transmitter must be capable of operating at the necessary high frequency.

Figure 3:
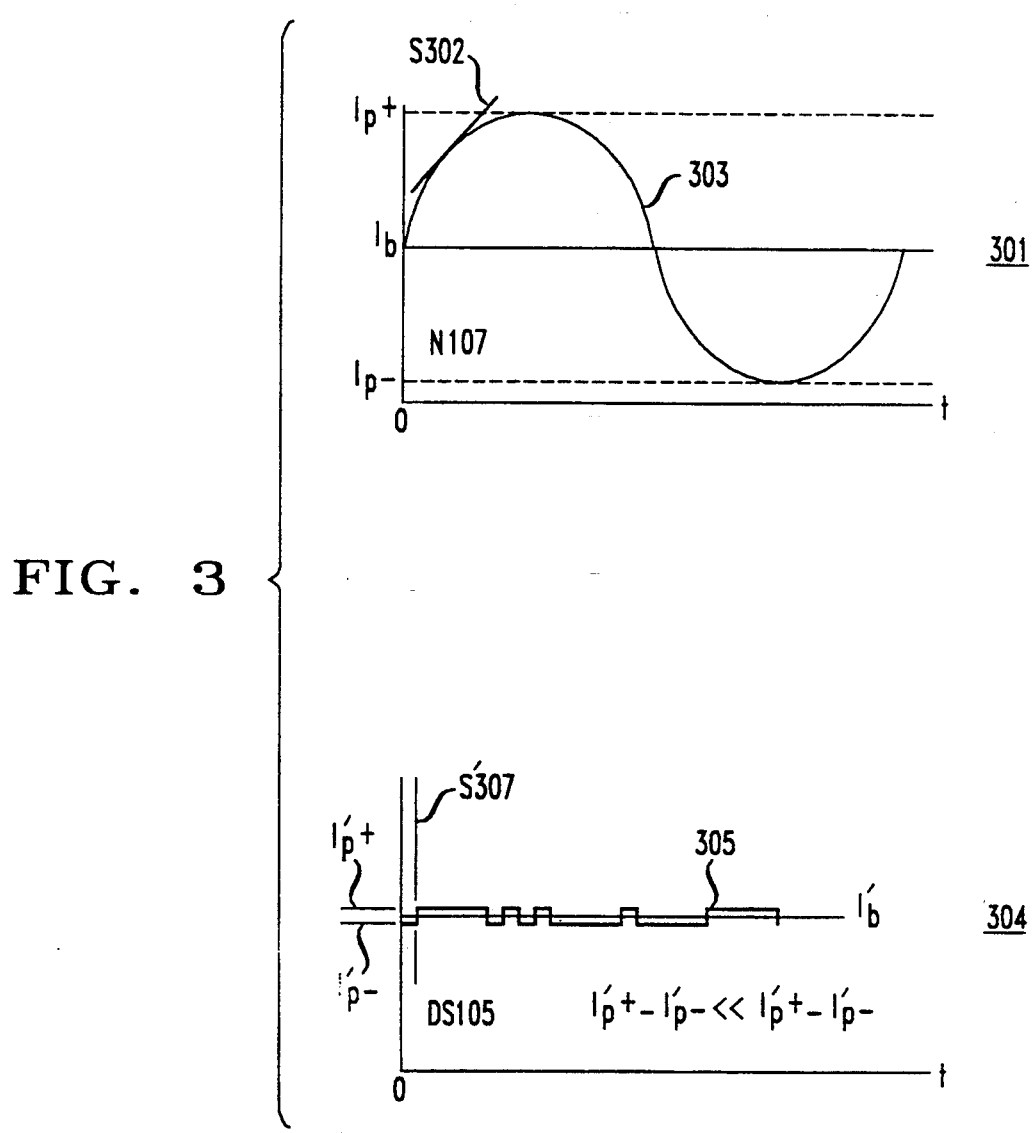
FIG. 3 shows the noise characteristic of an interior environment and a digital infrared signal.

The solution of the problem provided by the present invention may be best seen by considering FIG. 3. FIG. 3 shows two plots, one, 301 which shows the noise portion 303 of the signal, and another, 304, which shows the digital communications signal portion 305 of the signal. Two distinctions between the signals are important: first, the magnitude of noise 303, measured by $I^+_p - I^-_p$ is much larger than the magnitude of digital infrared communications signal 305, $I'^+_p - I'^-_p$. Second, the slope S 302 of noise signal 303 is much less steep than the slope S'307 of the rising and falling edges of digital infrared communications signal portion 305. Consequently, digital signal portion 305 can be detected in noise 303 by detecting the slopes of the rising and falling edges of digital signal portion 305.

Figure 4:
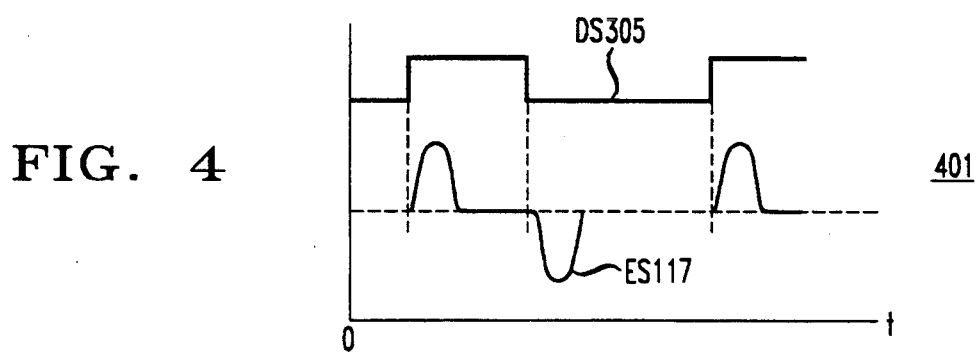
FIG. 4 shows the relationship between the digital infrared signal and an edge detection signal produced by the circuit of FIG. 1.

FIG. 1 is a block diagram of a circuit which performs such edge detection. Circuit 101 includes detector 103, which receives infrared radiation including digital signal 105 and noise 107, which has the same form as noise 303. Detector 103 converts the infrared radiation to input signal 109, which includes a noise component 303 and a digital signal component 305. The information in input signal 109 is expressed as variations in the current of input signal 109. The next component of the circuit is current amplifier 111, which amplifies input signal 109. The amplified signal goes to current-voltage converter and high-pass filter 113. The current-voltage conversion function converts the signal so that the information expressed by the current is now expressed by the voltage. The high pass filter function simply prevents saturation of the stage from low frequency high-amplitude noise. The output of converter and filter 113 goes to differentiator 115, which measures the slope of the input signal and outputs edge signal 117, which has a voltage proportional to that slope. Since the only portion of input signal 109 which has a steep slope is the rising and falling edges of digital signal 305, the rising and falling edges can be identified from edge signal 117. FIG. 4 shows the relationship between digital signal 305 and edge signal 117. Shortly after differentiator 115 encounters a rising edge in digital signal 305, differentiator 115 generates the positive pulse shown in edge signal 117 in FIG. 4; similarly, shortly after differentiator 115 encounters a falling edge in digital signal 305, differentiator 115 generates the negative pulse shown in edge signal 117 in FIG. 4. The components in box 110 of FIG. 1 therefore make up an edge detector for digital signal 305.

The remainder of circuit 101 simply converts edge signal 117 into a sequence of bits, with positive pulses corresponding to changes from the binary value "0" to the binary value "1" and negative pulses corresponding to changes from the binary value "1" to the binary value "0". The components of this portion include gain 118, which amplifies edge signal 117, schmitt trigger 119, which converts the pulses to changes in the binary values, so that the output 125 has the same form as digital signal 105, and is hence termed recovered digital signal 125, and buffer 123, which isolates circuit 101 from subsequent circuitry which will receive recovered digital signal 125.

Figure 2:
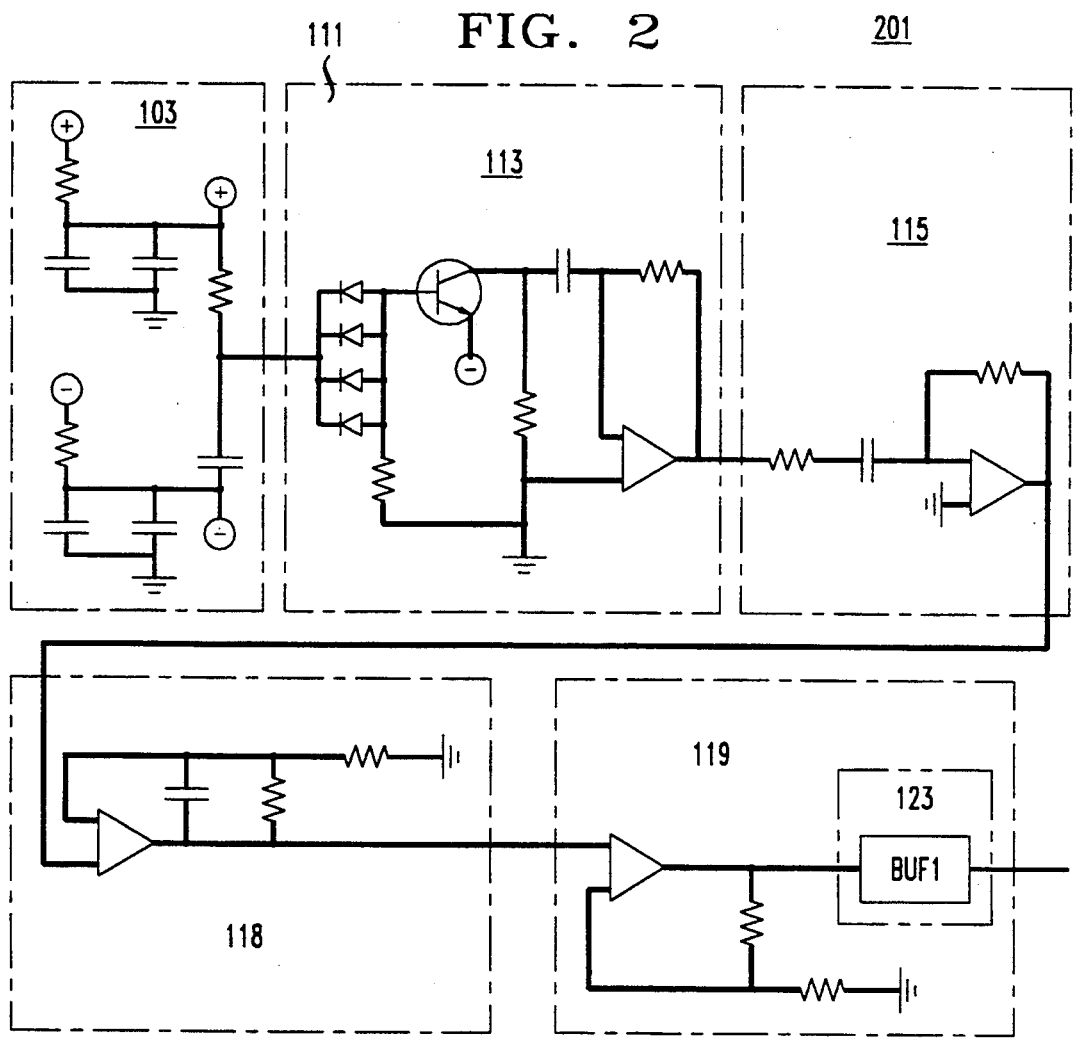
FIG. 2 is a schematic of a preferred embodiment of the circuit of FIG. 1.

FIG. 2 is a schematic of circuit 201, a presently-preferred embodiment of circuit 101. The components of circuit 201 which correspond to the functional blocks of circuit 101 are indicated by dashed lines in circuit 201. The PIN diodes in component 103 are SFH-206 diodes manufactured by Siemens; the op amp in component 113 is an OP37 manufactured by Analog Devices; the op amp in component 115 is an OP64 manufactured by Analog devices; the op amp in component 118 is an LF356 manufactured by Motorola, the op amp in component 119 is a UA710 manufactured by Texas Instruments, and component 123 is a buffer 75176 manufactured by Texas Instruments.

Infrared Communications System Incorporating the Invention

Figure 5:
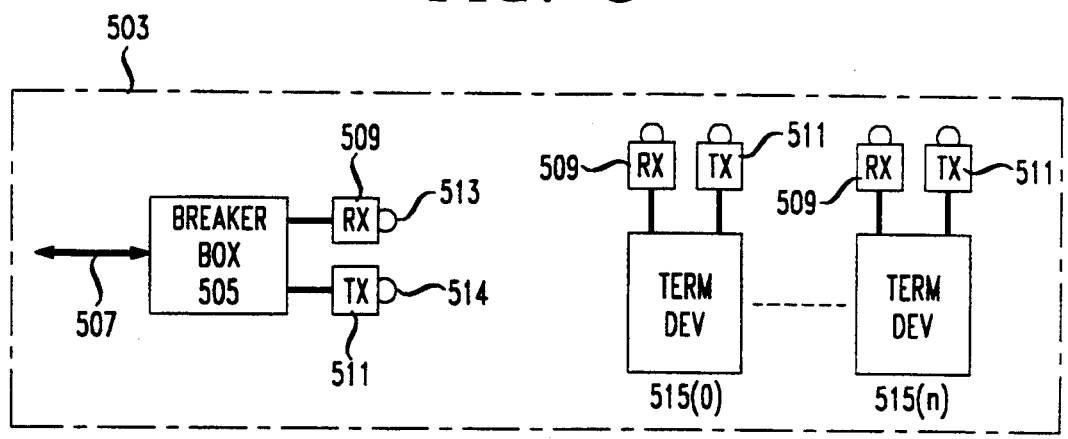
FIG. 5 shows a digital communications system which employs the circuit of FIG. 1.

FIG. 5 shows an infrared communications system 501 which incorporates circuit 101. All of the components of system 501 are in a single enclosed space 503, whose size is limited only by the power of the infrared signal being transmitted. Infrared communications system 501 is connected to Datakit ®, a digital virtual circuit network manufactured by AT&T, via trunk 507. Breaker box 505 is the interface between the protocols used in infrared communications system 501 and those employed in Datakit. The protocols employed in infrared communications system 501 are the INCON protocols, described in U.S. Pat. No. 4,787,082, Delaney et al., *Data Flow Control Arrangement for LAN*, issued Nov. 22, 1988. System 501 may, however employ other protocols, for example, ETHERNET ® protocols, and breaker box 505 may be connected to networks which use protocols other than the Datakit protocols.

In addition to breaker box 505, system 501 consists of some number of terminal devices 515. A terminal device 515 may be any device which can communicate using the INCON protocols, for example a "dumb" terminal, an intelligent workstation, or a portable telephone. Breaker box 505 and each of terminal devices 515 have connected to them an infrared transmitter 511 and an infrared receiver 509. In infrared transmitter 511, an infrared source 514 outputs a digital infrared signal. In infrared receiver 509, a collector 513 receives the digital infrared signal.

Operation of system 501 is as follows: as specified in the INCON protocol, breaker box 505 operates in one of three states: receive, transmit, and polling. In the receive state, breaker box 505 transmits a receive code. When a terminal 515 has data to send, it responds to the receive code by transmitting its address and listening to the results of the contention between that address and the address sent by any other terminal 515 which wishes to send. Each terminal 515 has a preassigned priority, and if the results of the contention matches the preassigned priority, terminal 515 sends a message which has a maximum length of 9 16-byte packets. At the end of the message, if breaker box 505 is still in the receive state, it again transmits the receive code.

In the send state, breaker box 505 transmits a send code and the address of a terminal 515 which is to receive a message and then sends a message of up to 9 16-byte packets. The terminal 515 specified by the address then receives the message. In the polling state, breaker box 505 determines what terminal devices 515 are presently active. Breaker box 505 transmits a poll code and the address of a terminal 515 and waits for a reply from the terminal 515. If terminal 515 is active, it responds to the poll code by transmitting a status packet.

As can be seen from the foregoing, operation of system 501 employing infrared communication signals is substantially the same as operation of any digital communications system, except that the protocols are carried by infrared signals. Indeed, conversion of a standard system using the INCON protocols to one using infrared signals requires only two modifications: first, logic in breaker box 505 must ensure that when breaker box 505 is in receive mode, the addresses received from the contending terminal devices 515 axe retransmitted by transmitter 511. Second, since receiver 509 detects the edges of the digital signals rather than their levels, contention priorities are resolved on the basis of the edges rather than the levels, and consequently, it may be necessary to change the addresses of terminals 515 to maintain a preestablished priority.

Figure 6:
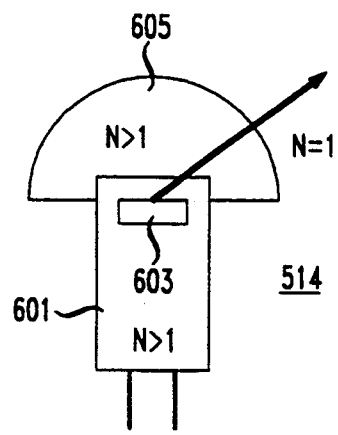
FIG. 6 shows an infrared source in a preferred embodiment.

Infrared Source 514:FIG. 6

Two further details of system 501 need to be described, namely infrared source 514 and infrared collector 513. FIG. 6 shows infrared source 514. Source 514 has three main components: light-emitting diode 603, transparent plastic package 601, and transparent plastic hemisphere 605. Diode 603 and its packaging 601 are part SFH-415 manufactured by Siemens. Diode 603 has an operating frequency too low to permit significant up modulation. In infrared source 514, packaging 601 has been glued to plastic sphere 605, thus effectively optically coupling diode 603 to hemisphere 605. The coupling of diode 603 to hemisphere 605 has two effects: it minimizes the effect of the difference in indexes of refraction between the air and plastic packaging 601 and thereby ensures that most of the light produced by diode 603 leaves packaging 601, and it further ensures that the infrared radiation emitted by the diode is distributed evenly throughout a half-space defined by the base of the hemisphere.

Figure 7:
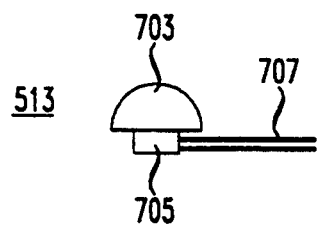
FIG. 7 shows an infrared collector in a preferred embodiment.

Infrared Collector 513:FIG. 7

Infrared collector 513 in the preferred embodiment is shown in FIG. 7. It is made up of a solid plastic hemisphere 703 to which is glued a detector 705 consisting of an array of four plastic-packaged PIN diodes SFH-206, manufactured by Siemens. Detector 705 is connected via conductors 707 to the remainder of circuit 101. Transparent solid plastic hemisphere 703 serves as a concentrator, and the glue serves to optically couple the PIN diodes to the hemisphere 703. Hemisphere 703, the glue, and the plastic encasing the PIN diodes all have substantially the same optical index of refraction. In other embodiments, hemisphere 703 may be integral with the packaging of the diodes. In such an embodiment, materials with an index of refraction substantially higher than that of plastic may be employed and the concentrating effect of the hemisphere thereby increased.

In a preferred embodiment, the hemisphere may have any radius which is greater than or equal to a value determined as follows: the index of refraction of the plastic making up the hemisphere is N; the distance d is the distance from the center of detector 705 to the most remote part of the infrared-sensitive material; the minimum radius of the hemisphere is then dN. The fact that only a minimum radius of the hemisphere is determined by the size of detector 705 simplifies fabrication of the collector and further permits the size of hemisphere 703 to be altered to diminish the loss of light due to reflection.

The degree of concentration provided by hemisphere 703 is substantially independent of its radius and approaches $N^2$; thus, in the preferred embodiment, where the plastic used in the hemisphere has an index of refraction of substantially $\sqrt{2}$, the degree of concentration is 2.

Hemisphere 703 may further be replaced by any transparent dielectric solid such that: that:
the solid is convex above a base plane determined by the top surface of detector 705; and
any ray which connects any part of the top surface of detector 705 to any part of the solid above the base plane intersects the surface of the solid at an an angle less than the critical angle for the material.
Moreover, the convex shape may be formed such that signals from certain areas of the half space are concentrated more than signals from other areas of the half space. For example, the concentrator for a collector used in an indoor environment may be modified such that it preferentially concentrates light from areas other than directly above the concentrator, and may thus act to diminish the response of detector 705 to light from the interior lighting. One such modification is to simply flatten the top of hemisphere 703.

Operating Efficiency of System 501

The efficencies provided by edge detection circuit 101, infrared source 514, and infrared collector 513 are such that the only requirement regarding location of terminals 515 and breaker box 505 in system 501 is that each terminal's transmitter 511 and receiver 509 be in line of sight of the transmitter 511 and receiver 509 of breaker box 505 (i.e., there is no need to aim transmitters 511 and receivers 509). This non-directional, line of sight arrangement of the components is achieved even though system 511 uses low-cost components and operates with only 60 milliwatts of transmitted optical power in a room 14 feet on a side. In spite of the low power and non-directional arrangement, components of system 501 are able to transmit and receive at a rate of two megabits/second. The low power requirements permit construction of light-weight portable terminals 515 which are able to operate for extensive periods on battery power.

Conclusion

The foregoing Detailed Description has disclosed techniques which permit those of ordinary skill in the art to construct low-power, low-cost, light-weight digital equipment which can employ infrared light for communication in environments with large amounts of infrared noise and which requires only that the pieces of equipment be within line of sight of each other. The techniques include circuitry for detecting infrared digital signals from the slopes of their rising and falling edges, an infrared source which provides an efficient coupling between the light-emitting diode which provides the signal and the air and which further distributes the signal equally throughout a half space, and an infrared collector which employs a non-directional concentrator to concentrate infrared radiation on an array of PINs.

These techniques are particularly advantageous when combined in the digital communication system disclosed herein, but are also useful in other types of systems. For example, the edge detection technique disclosed herein is not limited to infrared radiation, but may be used in any circumstance where there is a substantial difference in slope between the signals making up the noise and the signals carrying the information. Similarly, the infrared collector of the preferred embodiment may be employed with other types of infrared communications systems and also with communications systems employing visible light.

While the embodiment disclosed herein is the best one presently known to the inventor, the edge detection technique may be embodied in circuits other than the one disclosed herein and infrared sources and collectors working on the principles disclosed herein may be made of materials different from those disclosed herein and in the case of the collectors, may employ different kinds of non-directional concentrators. Finally, the communications system is not limited to the INCON protocol, but may be used with communications protocols of any kind.

Because the embodiment disclosed herein is only one of many possible embodiments of the techniques with which the invention is concerned, the foregoing Detailed Description is to be understood as being in every respect illustrative and exemplary, but not restrictive. The scope of the invention disclosed herein is therefore not to be determined from the Detailed Description, but rather from the attached claims, which are to be given the broadest interpretation to which they are entitled under the law.

What is claimed is:

1. Apparatus for detecting a digital signal representing digital data comprising:
    first means for providing an input signal including the digital signal and noise which has a larger magnitude than the digital signal and a slow rate of change relative to the digital signal's rise time;
    second means coupled to the first means for deriving a signal indicating the digital data from the input signal; and
    third means coupled to the second means for deriving the digital data from the signal indicating the digital data,
    the apparatus being characterized by
    means in the second means for receiving the input signal, detecting edges of the digital signal therein, and outputting an edge signal indicating each detected edge's direction as the signal indicating the digital data to the third means.

2. The apparatus set forth in claim 1 further characterized in that:
    the means for detecting edges includes differentiation means for outputting a slope derived from the input signal as the edge signal.

3. The apparatus set forth in claim 2 further characterized in that; the differentiation means is an operational amplifier.

4. The apparatus set forth in any of claims 1, 2, or 3 further characterized in that;
    the first means for providing an input signal is infrared collector means coupled to the means for detecting edges for responding to infrared radiation including an infrared digital signal by providing the input signal.

5. The apparatus set forth in claim 4 further characterized in that;
    the infrared collector means includes infrared radiation detection means and a nondirectional concentrator for concentrating the infrared radiation on the infrared radiation detection means.

6. The apparatus set forth in claim 5 further characterized in that:
    the concentrator is made of a light-transmitting dielectric material and has a convex shape with respect to a base plane;
    the infrared radiation detection means is coupled to the base plane; and
    the convex shape is such that any line which connects any part of the infrared radiation detection means to the surface of the convex shape intersects the surface of the concentrator at an angle less than the critical angle for the material.

7. The apparatus set forth in claim 4 further characterized in that:
    the infrared digital signal is not upmodulated above infrared noise emitted by interior lighting powered by alternating current.

8. A digital infrared communications system comprising
    a transmitter for emitting a digital infrared signal representing digital data and
    a receiver including
    infrared collector means responsive to infrared radiation including the digital infrared signal and noise which has a larger magnitude than the digital infrared signal and a slow rate of change relative to the digital infrared signal's rise time, the infrared collector means providing an input signal having a digital signal portion and a noise portion,
    digital signal detection means coupled to the infrared collector means for deriving a signal indicating the digital data from the input signal; and
    digital data deriving means coupled to the digital signal detection means for deriving the digital data from the signal indicating the digital data,
    the digital infrared communications system being characterized in that:
    the digital signal detection means includes means for detecting edges of the digital signal portion in the input signal and outputting an edge signal indicating the direction of each detected edge as the signal indicating the digital data.

9. The communications system set forth in claim 8 further characterized in that
    the digital data deriving means includes means for receiving the edge signal and responding thereto by outputting a digital signal having an edge as indicated by the edge signal.

10. The communications system set forth in claim 8 further characterized in that:
    the means for detecting edges includes differentiation means for outputting a slope derived from the input signal as the edge signal.

11. The communications system set forth in claim 10 further characterized in that:
    the differentiation means is an operational amplifier.

12. The digital infrared communications system set forth in claim 8 further characterized in that:
    the transmitter includes digital infrared signal emitting means whose operating speed does not permit upmodulation of the digital signal above the frequencies of infrared noise emitted by interior lighting powered by alternating current.

13. The digital infrared communications system set forth in claim 8 further characterized in by:
    means coupled to the digital infrared signal emitting means for distributing the digital infrared signal throughout a half space.

14. The digital infrared communications system set forth in claim 13 further characterized in that:
    the infrared collector means includes
    infrared radiation detection means and
    a nondirectional concentrator for concentrating the infrared radiation on the infrared radiation detection means.

15. The digital infrared communications system set forth in claim 14 further characterized in that:

the concentrator is made of a light-transmitting dielectric material and has a convex shape with respect to a base plane;

the infrared radiation detection means is coupled to the base plane; and the convex shape is such that any line which connects any part of the infrared radiation detection means to the surface of the convex shape intersects the surface of the concentrator at an angle less than the critical angle for the material.

16. The apparatus set forth in claim 8 further characterized in that:

the infrared collector means includes infrared radiation detection means and a nondirectional concentrator for concentrating the infrared radiation on the infrared radiation detection means.

17. The apparatus set forth in claim 16 further characterized in that:

the concentrator is made of a light-transmitting dielectric material and has a convex shape with respect to a base plane;

the infrared radiation detection means is coupled to the base plane; and the convex shape is such that any line which connects any part of the infrared radiation detection means to the surface of the convex shape intersects the surface of the concentrator at an angle less than the critical angle for the material.

18. Apparatus for communicating using a digital infrared signal, the apparatus comprising at least a receiver including infrared collector means for responding to infrared radiation including the digital infrared signal and noise which has a larger magnitude than the digital signal and a slow rate of change relative to the digital signal's rise time, the infrared collector means providing an input signal having a digital portion and a noise portion, digital signal detection means coupled to the infrared collector means for deriving a signal indicating the digital data from the input signal; and digital data deriving means coupled to the digital signal detection means for deriving the digital data from the signal indicating the digital data, the apparatus being characterized by:

means in the digital signal detection means for detecting edges of the digital signal portion in the input signal and outputting an edge signal indicating each detected edge's direction as the signal indicating the digital data to the third means.

19. The apparatus set forth in claim 18 further characterized in that:

the means for detecting edges includes differentiation means for outputting a slope derived from the input signal as the edge signal.

20. The apparatus set forth in claim 19 further characterized in that: the differentiation means is an operational amplifier.

21. The apparatus set forth in claim 18 further including a transmitter for emitting the digital infrared signal and further characterized in that:

the transmitter includes digital infrared signal emitting means whose operating speed does not permit upmodulation of the digital signal above infrared noise emitted by interior lighting powered by alternating current.

22. The apparatus set forth in claim 21 further characterized by:

means coupled to the digital infrared signal emitting means for distributing the digital infrared signal throughout a half space.

23. The apparatus set forth in any of claims 18, 19, 20, 16, 17, 21, or 22 further characterized in that the apparatus is battery powered.

24. Apparatus for coupling a digital device to a network by means of digital infrared signals, the apparatus comprising:

a breaker box for interfacing between the network and the digital device, transmitters on the breaker box and the digital device for transmitting the digital infrared signals, and receivers on the breaker box and the digital device for receiving the digital infrared signals, each receiver including infrared collector means for responding to infrared radiation including the digital infrared signal and noise which has a larger magnitude than the digital infrared signal and a slow rate of change relative to the digital infrared signal's rise time, the infrared collector means providing an input signal which has a digital signal portion and a noise portion, digital signal detection means coupled to the infrared collector means for deriving a signal indicating the digital data from the input signal; and digital data deriving means coupled to the digital signal detection means for deriving the digital data from the signal indicating the digital data, the digital infrared communications system being characterized in that:

the digital signal detection means includes means for detecting edges of the digital signal portion in the input signal and outputting an edge signal indicating the direction of each detected edge as the signal indicating the digital data.

25. The apparatus set forth in claim 24 further characterized in that:

the means for detecting edges includes differentiation means for outputting a slope derived from the input signal as the edge signal.

26. The apparatus set forth in claim 25 further characterized in that: the differentiation means is an operational amplifier.

27. The apparatus set forth in claim 24 further characterized in that:

the transmitter includes digital infrared signal emitting means whose operating speed does not permit upmodulation of the digital signal above infrared noise emitted by interior lighting powered by alternating current.

28. The apparatus set forth in claim 24 further characterized by:

means coupled to the digital infrared signal emitting means for distributing the digital infrared signal throughout a half space.

29. The apparatus set forth in claim 24 further characterized in that:

the infrared collector means includes infrared radiation detection means and a nondirectional concentrator for concentrating the infrared radiation on the infrared radiation detection means.

30. The apparatus set forth in claim 29 further characterized in that:

the concentrator is made of a light-transmitting dielectric material and has a convex shape with respect to a base plane;

the infrared radiation detection means is coupled to the base plane; and the convex shape is such that any line which connects any part of the infrared radiation detection means to the surface of the convex shape intersects the surface of the concentrator at an angle less than the critical angle for the material.

31. The apparatus set forth in any of claims 24, 25, 26, 27, 28, 29, or 30 further characterized in that:
   the digital device is battery powered.

* * * * *